United States Patent [19]

Cornille, Jr.

[11] Patent Number: 5,362,120
[45] Date of Patent: Nov. 8, 1994

[54] VEHICLE BODY CONSTRUCTION AND METHOD FOR INSPECTION OF ADHESIVELY SECURED JOINTS THEREIN

[75] Inventor: Henry J. Cornille, Jr., Farmington Hills, Mich.

[73] Assignee: Ford Motor Company, Dearborn, Mich.

[21] Appl. No.: 43,087

[22] Filed: Apr. 5, 1993

[51] Int. Cl.⁵ .......................................... B62D 25/00
[52] U.S. Cl. ................................. 296/203; 296/29; 296/209; 156/64; 156/295; 52/208
[58] Field of Search ................ 296/29, 203, 209, 187; 156/64, 295; 52/208, 400

[56] References Cited

U.S. PATENT DOCUMENTS

| | | |
|---|---|---|
| 2,601,703 | 7/1952 | Sawyer . |
| 3,379,813 | 4/1968 | Austin . |
| 3,429,023 | 2/1969 | Blythe et al. . |
| 3,606,446 | 9/1971 | Leslie . |
| 3,680,910 | 8/1972 | Stanner ............................ 296/29 |
| 3,701,560 | 10/1972 | Emmerson . |
| 4,518,196 | 5/1985 | Forster et al. . |
| 4,552,400 | 11/1985 | Harasaki et al. ................ 296/209 X |
| 4,684,167 | 8/1987 | Newmayer . |
| 4,759,809 | 7/1988 | Matsuo et al. . |
| 4,804,222 | 2/1989 | Sakiyama et al. ............... 296/209 X |
| 4,853,055 | 8/1989 | Taylor ............................. 296/93 X |
| 4,978,164 | 12/1990 | Nakamura et al. ............. 296/203 X |
| 5,044,646 | 9/1991 | Iiga et al. . |
| 5,067,997 | 11/1991 | LeClerc et al. . |
| 5,232,536 | 8/1993 | Oshiro et al. .................... 156/295 |
| 5,240,543 | 8/1993 | Fetterhoff et al. .............. 156/293 |
| 5,246,264 | 9/1993 | Yoshii ............................. 296/203 |

Primary Examiner—Joseph Pape
Attorney, Agent, or Firm—Roger L. May; Daniel M. Stock

[57] ABSTRACT

A vehicle body construction (10) and method including inspection of adhesively secured joints therein is provided. The vehicle body construction (10) comprises a pair of body members (18,20) having opposed surfaces (24,26). An adhesive bond (28) secures the opposed surfaces (24,26) to each other to thereby connect the pair of body members (18,20). One of the body members has small inspection openings (22) at spaced intervals to permit visual observation of whether there is adhesive (12) between the opposed surfaces (24,26) at the spaced intervals to thereby provide an indication of the integrity of the bond (28). The method includes forming body members (18,20) with opposed surfaces (24,26) having inspection openings (22) at spaced intervals, forming an adhesive bond (28) between the opposed surfaces (18,20) to connect the body members (18,20) and visually observing the inspection openings (22) for the presence of the adhesive (12) for an indication of the integrity of the adhesive bond (28). After curing, adhesive bond (28) may be tactilely probed for hardness as an evidence of proper curing.

20 Claims, 2 Drawing Sheets

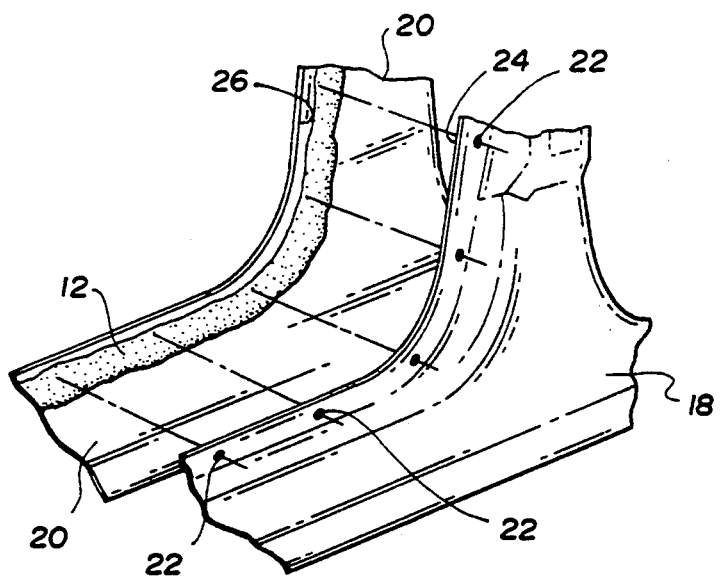
*Fig. 3*
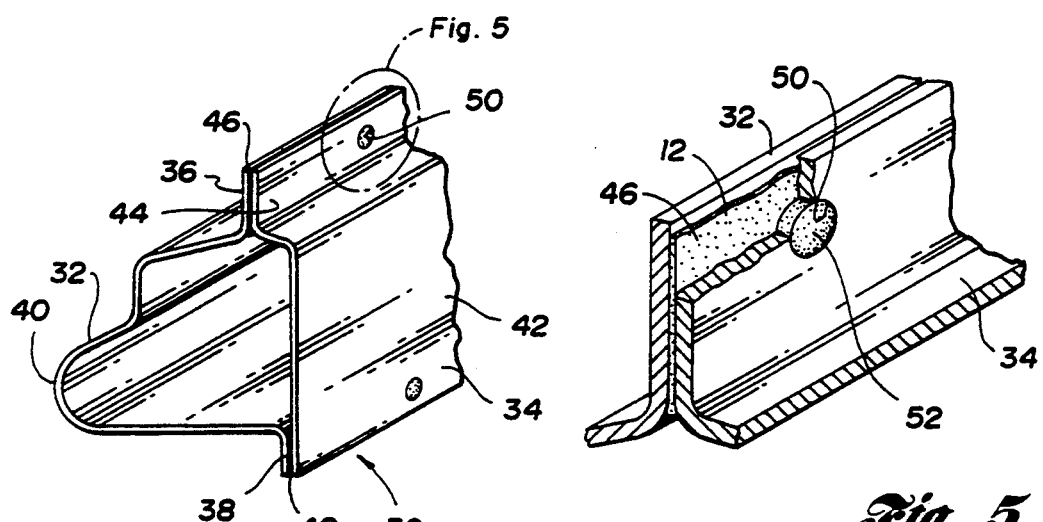
*Fig. 4*
*Fig. 5*
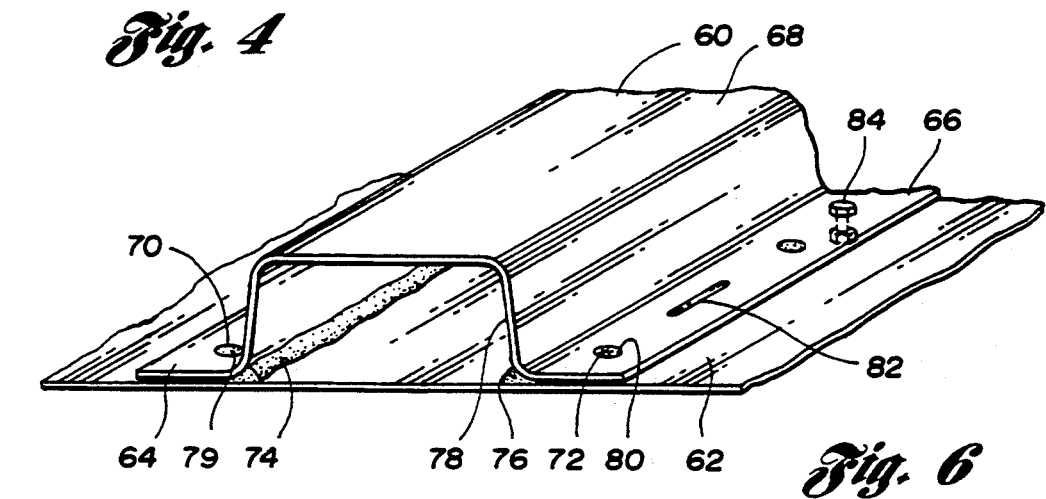
*Fig. 6*

VEHICLE BODY CONSTRUCTION AND METHOD FOR INSPECTION OF ADHESIVELY SECURED JOINTS THEREIN

TECHNICAL FIELD

The present invention relates to vehicle body constructions and methods for inspecting joints formed between vehicle body members.

BACKGROUND ART

Vehicle bodies are generally comprised of stamped or molded body members. These body members most often are made of steel, however, other materials such as aluminum or plastic may also be used.

Methods for joining the body members may include welding, riveting, using mechanical fasteners, and crimping or clinching parts together. Riveting and using mechanical fasteners join discrete portions of the body members together. Similarly, weld joints are often made at spaced intervals, rather than continuously, to reduce the cost of assembling the vehicle body.

One disadvantage to joining body members together only at discrete locations, as compared to using continuous joints, is that the vehicle body then has a reduced rigidity or stiffness. Ideally, the vehicle body would be as rigid as possible to limit deflections of the vehicle body. Further, increasing the vehicle body stiffness raises the natural frequencies and changes the modes of vibration of the vehicle body.

The largest forces input to the vehicle body during normal vehicle operation are ground forces, such as those caused by hitting a pothole or running over rough terrain. These forces are transferred through the vehicle suspension system to the vehicle body. While relatively large in magnitude, these forces are usually associated with low frequencies.

Accordingly, by making the vehicle body very stiff and raising the natural frequencies of the body components and vehicle body, the ground forces are less likely to cause a resonant condition to occur in the vehicle body.

Another source of forces input to the vehicle body is the vehicle drivetrain. These forces are generally smaller in magnitude than the ground forces but higher in frequency.. Again, it is advantageous to increase vehicle body stiffness to reduce the effects these forces have on the vehicle body.

The above-described methods of joining body members together to construct and stiffen a vehicle body have numerous shortcomings. First, stiffening a vehicle body by adding large, continuous welds between body members introduces significant additional weight to the vehicle body which is undesirable. A further disadvantage to using welding is that not all materials are readily weldable together to form strong joints. Aluminum and plastics are good examples. Adding stiffness by increasing the number of mechanical fasteners, such as bolts, rivets, or clips, also adds significant weight while increasing the complexity and cost of construction.

One method of increasing stiffness while adding little overall weight to a vehicle body is by using adhesive joints. Adhesive joints can provide a virtually continuous connection between body members, thereby increasing stiffness, while doing so with only thin layers of adhesives forming bonds between the body members. Consequently, very little weight is added to the overall vehicle body. In the event some of the welds or mechanical fasteners are replaced with adhesive joints, the overall weight of the vehicle body may actually decrease.

However, using adhesive joints also has its drawbacks. First, the adhesive joints are often located in regions where the joints are not visible after vehicle body assembly. Accordingly, checking on the quality or integrity of the joint is difficult. These hidden joints may be inspected for the presence of adhesive using ultrasonic equipment. However, such evaluation is time consuming and expensive.

To quickly cure these adhesive joints, the vehicle bodies are placed in curing furnaces. After removal from the curing furnace, as the adhesive joints are hidden, they are difficult to inspect to insure that proper curing has indeed occurred.

Another method of ensuring that an adhesive bond joint is present is by providing excessive adhesive and checking to see that adhesive is squeezed from between free edges of the body members. This method is messy and wastes adhesive. Excessive adhesive located on exposed surfaces can cause gumming and may adversely affect welding apparatus or other fastening equipment. Accordingly, this method is also undesirable.

For the foregoing reasons, there is a need for a vehicle body construction which utilizes a low cost reliable method for inspecting adhesive bonds or joints between body members. The present invention is intended to minimize the above-described shortcomings of previous vehicle body constructions and their methods of manufacture.

SUMMARY OF THE INVENTION

The present invention includes a vehicle body construction comprising a pair of body members having opposed complementary surfaces and an adhesive bond that secures the opposed surfaces to each other thereby connecting the pair of body members. One of the body members has small inspection openings at spaced intervals to permit visual observation of whether there is adhesive between the opposed surfaces at spaced intervals to thereby provide an indication of the integrity of the bond.

Ideally, while other connectors such as welds and mechanical fasteners are also employed, the use of the adhesive bond allows for a reduction in their number while providing for more continuous joints.

The present invention also includes a method of joining a pair of vehicle body members. The method includes forming a first vehicle body member which has a first surface with inspection openings therein at spaced intervals. A second vehicle body member is formed which has a second surface thereon. An adhesive is placed between the first and second surfaces of the respective vehicle body members. The body members are then pressed together with the first and second surfaces being in opposition with one another to form an adhesive bond connecting the surfaces. The adhesive is then cured. The inspection openings are visually observed for the presence of the adhesive at spaced intervals to thereby provide an indication of the integrity of the adhesive bond. Further, the adhesive bond may be probed to insure the adhesive bond is properly cured.

It is an object of the present invention to provide a vehicle body construction which is easily inspected for an indication of the integrity of an adhesive bond connecting vehicle body members together.

Yet another object of the present invention is to provide a method of vehicle body construction wherein an adhesive bond is used to join a pair of vehicle body members together, one of the vehicle body members being provided with inspection openings so that the presence of the adhesive bond can be visually observed between opposing surfaces of the body members.

BRIEF DESCRIPTION OF THE DRAWINGS

These and other objects and advantages of the present invention will become better understood with regard to the following description, appended claims and accompanying drawings wherein:

FIG. 3 is an exploded perspective view from FIG. 2 showing an adhesive interposed between opposing surfaces of the inner and outer body side panels;

FIG. 4 is a fragmentary perspective view of a body side rail;

FIG. 5 is an enlarged cut-away view from the encircled area of FIG. 4 showing an adhesive bond interposed between opposing surfaces with a plug of adhesive extruding through an inspection opening; and FIG. 6 is a perspective view of a front floor crossmember secured to a front floor pan.

BEST MODE FOR CARRYING OUT THE INVENTION

Figure 1:
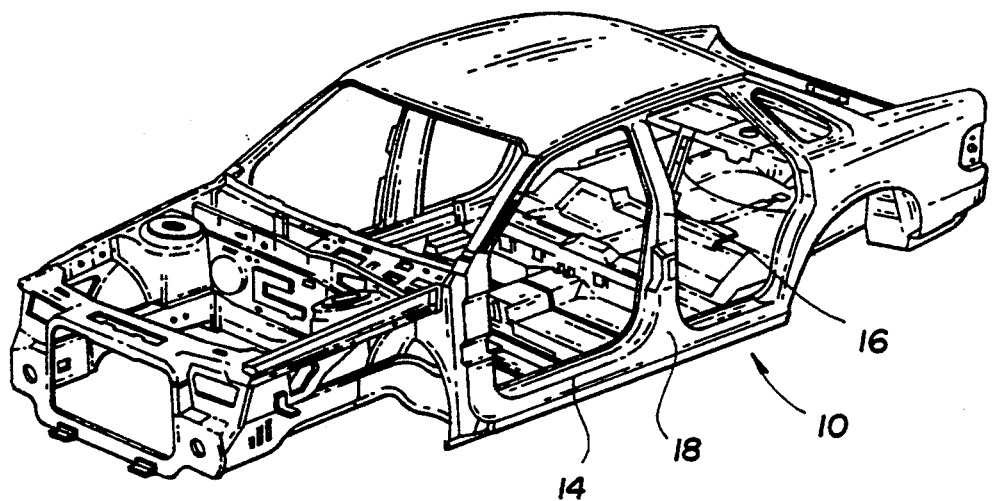
FIG. 1 is a perspective view of a vehicle body construction made in accordance with the present invention.

Turning now to FIG. 1, a vehicle body 10 is shown having numerous vehicle body members which are joined together with the assistance of an adhesive 12. Other structural methods of securing the body members together, i.e. welding, riveting, or using mechanical fasteners, are generally used in conjunction with the adhesive 12 as is dictated by strength and safety considerations of a particular joint and also to hold the body members in position until adhesive 12 is cured. With the additional use of adhesive 12, the overall number of welds, rivets or fasteners used to join the body members together can be reduced. Moreover, the weight of vehicle body 10 is decreased while its structural stiffness is increased.

Figure 2:
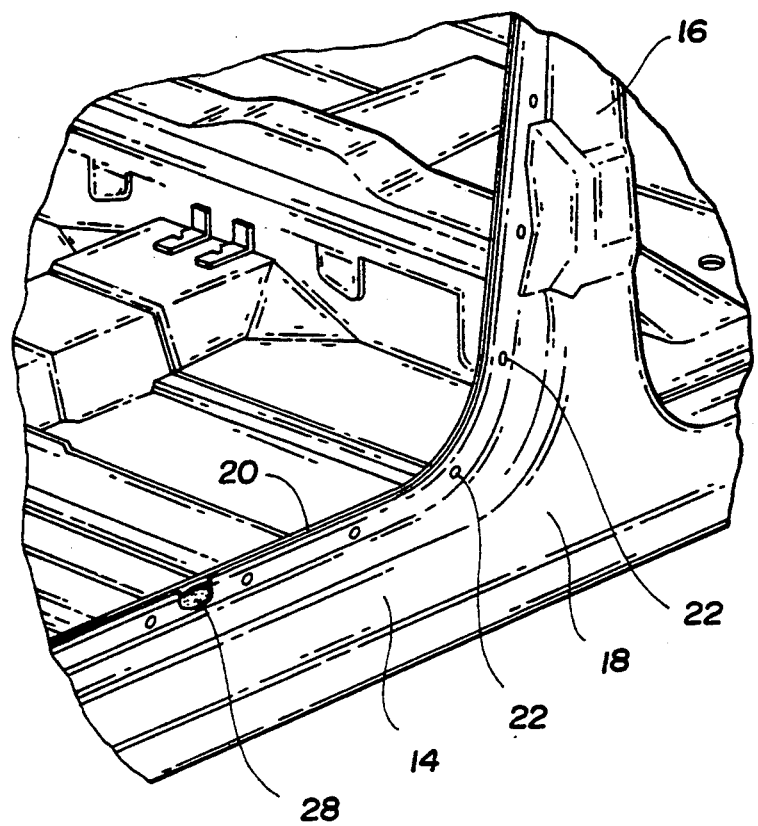
FIG. 2 is an enlarged fragmentary view from FIG. 1 of inner and outer body side panels forming a rocker panel and a B-pillar.

As a first example of body members which are adhesively joined together, FIG. 2 shows an enlarged view of a rocker panel 14 and a B-pillar 16. FIG. 3 illustrates portions of outer and inner door opening panels 18 and 20 which are secured together to form rocker panel 14 and B-pillar 16.

A number of inspection openings 22 are located at spaced intervals along the periphery of outer door panel 18. Outer and inner door opening panels 18 and 20 have opposing first and second surfaces 24 and 26 which are configured to complementarily mate with one another.

Adhesive 12 is applied, preferably by a robot, continuously as a bead along second surface 26. Alternatively, a series of intermittent beads could be used. Inspection openings 22 are aligned such that when opposing first and second surfaces 24 and 26 are positioned adjacent one another, such as in a positioning fixture (not shown), adhesive 12 will be squeezed and will form an adhesive bond 28 connecting outer and inner door panels 18 and 20. The inspection openings preferably are spaced equidistantly apart. Ideally, the contours on surfaces 24 and 26 are compatible such that adhesive 12 forms adhesive bond 28 of uniform thickness between surfaces 24 and 26.

Visual observation of inspection openings 22 will provide an indication of the presence of adhesive 12. Accordingly, if adhesive 12 is seen in an inspection opening 22, it is known that at least adjacent to inspection openings 22, adhesive 12 is present. If adhesive 12 is seen in adjacent inspection openings 22, it is likely that a good adhesive bond 28 will be formed in the interval between the openings 22. Alternatively, if the visual inspection shows that no adhesive 12 is present in opening 22, then the integrity of adhesive bond 28 is suspect.

To accelerate curing, vehicle body 10 is placed in a curing oven. After removal from the curing oven and vehicle body cooling, adhesive bond 28 may be probed with a suitable known tool or instrument through inspection openings 22 to check its hardness which is indicative of the degree of curing. Further steps such as ultrasonic testing may be performed to further determine the quality of adhesive bond 28.

Another example of a pair of body components which are adhesively secured together is shown in FIG. 4. Body side rail 30 is comprised of a door opening panel 32 and a floor side inner panel 34. Door opening panel 32 has a pair of spaced apart flanges 36 and 38 connected by a contoured center portion 40. Floor side inner panel 34 has a flat portion 42 and a flange 44. Flanges 36 and 38 of door opening panel 32 are positioned adjacent flange 44 and flat portion 42 of floor side panel 34 with adhesive bonds 46 and 48 connecting therebetween.

The blow-up in FIG. 5 shows adhesive 12 is squeezed and spreads out to form adhesive bond 46 without contaminating the exterior surfaces of body side rail 30 or door opening panel 32. An inspection opening 50 has a plug 52 of adhesive bond 46 therein. By visually observing the existence of plug 52, the presence of adhesive bond 46, at least locally, can be visually verified.

Another example of vehicle body members which may utilize adhesive bonding is shown in FIG. 6. A front floor cross member 60 is mounted upon a floor pan 62. Cross member 60 has a pair of spaced flanges 64 and 66 adjoining a U-shaped portion 68. Flanges 64 and 66 have inspection openings 70 and 72 therein. Adhesive bonds 74 and 76 adhesively connect cross member 60 with floor pan 62 creating a box section 78.

Plugs 79 and 80 protrude into inspection openings 70 and 72. Accordingly, adhesive bonds 74 and 76 can be visually inspected and tactilely probed for evidence of joint integrity.

For exemplary purposes, FIG. 6 shows adhesive bonds 74 and 76 being assisted by a weld 82 and mechanical fastener 84 in securing flange 66 to a portion of floor pan 62.

Adhesive 12 extrudes only into inspection openings 70 and 72 and interiorly into the cavity created by box section 78. Restricting adhesive to interior surfaces, other than when extruding into inspection openings 70 and 72, insures that adhesive 12 does not contaminate exterior surfaces of vehicle body 10. Plugs 79 and 80 can be kept small by limiting the size of inspection openings 70 and 72.

While in the foregoing specification this invention has been described in relation to certain preferred embodiments thereof, and many details have been set forth for the purpose of illustration, it will be apparent to those skilled in the art that the invention is susceptible to alteration and that certain other details described herein can vary considerably without departing from the basic principles of the invention.

For example, when structurally allowable, body members may be made of aluminum, plastic, or other light-weight materials.

We claim:

1. A vehicle body construction comprising:
   a pair of structural body members having opposed surfaces;
   adhesive that forms a substantially concealed joint securing the opposed surfaces to each other to thereby connect the pair of structural body members; and
   one of the body members having small inspection openings formed through its opposing surface at spaced intervals to permit visual observation of whether there is adhesive between the opposed surfaces at the spaced intervals to thereby provide an indication of the integrity of the adhesive joint.

2. The vehicle construction of claim 1 wherein:
   the body members are also joined by welds at spaced intervals.

3. The vehicle construction of claim 1 wherein:
   the body members are also joined by mechanical fasteners at spaced intervals.

4. The vehicle body construction of claim 1 wherein:
   one body member has a pair of spaced apart flanges with a contoured body portion extending therebetween, the flanges having the inspection openings therein and the body members cooperating to form a box section with adhesive joints being formed between the flanges and the other body member.

5. The vehicle body construction of claim 1 wherein:
   one body member is a floor pan and the other is a floor cross member.

6. The vehicle construction of claim 1 wherein:
   the body members are inner and outer body side panels which combine to form a body side rail.

7. The vehicle construction of claim 1 wherein:
   one of the body members is made of a nonferrous metal.

8. The vehicle construction of claim 7 wherein:
   the non-ferrous metal is aluminum.

9. The vehicle construction of claim 1 wherein:
   one of the body members is plastic.

10. A method of joining a pair of vehicle body members, the method comprising:
    forming a first vehicle structural body member having a first surface including inspection openings at spaced intervals;
    forming a second vehicle structural body member having a second surface thereon;
    applying an adhesive on one of the surfaces;
    placing the surfaces in opposition with one another with adhesive therebetween;
    curing the adhesive to form an adhesive bond securing the surfaces together and forming a substantially concealed joint; and
    observing visually the inspection openings for the presence of adhesive for an indication of the integrity of the adhesive bond formed between the vehicle body members.

11. The method of claim 10 further comprising:
    probing the bond in the inspection openings to verify that the adhesive bond has properly cured.

12. The method of claim 10 further comprising:
    welding the body members together at spaced intervals.

13. The method of claim 10 further comprising:
    fastening the body members together at spaced intervals with mechanical fasteners.

14. The method of claim 10 which uses one body member made of a non-ferrous metal.

15. The method of claim 14 which uses aluminum as the non-ferrous metal.

16. The method of claim 10 which uses body members made of plastic.

17. The method of claim 10 wherein:
    the forming of the body members includes forming in one of the members a pair of flanges with inspection openings therein and a contoured body portion extending between the flanges, wherein the adhesive bonds are formed between the flanges and the other body member to form a box section.

18. An assembly of vehicle body panels, the assembly comprising:
    a first structural body panel;
    a second structural body panel, the panels having opposing surfaces;
    adhesive operatively disposed between the opposing surfaces of the panels to secure the panels together forming a substantially concealed joint; and
    inspection openings formed in one of the surfaces of a panel to permit visual inspection of the adhesive.

19. The assembly of claim 18 wherein:
    the inspection openings in the surface of the panel are spaced equidistantly apart.

20. The assembly of claim 18 wherein:
    the adhesive is a bead extending continuously along the opposing surfaces.

* * * * *